United States Patent

[11] 3,583,255

| [72] | Inventor | Robert T. Curcuru |
| | | 18603 Warwick Rd., Birmingham, Mich. 48009 |
| [21] | Appl. No. | 825,129 |
| [22] | Filed | May 12, 1969 |
| [45] | Patented | June 8, 1971 |

[54] SAFETY STEERING WHEEL
22 Claims, 10 Drawing Figs.

[52] U.S. Cl. .................................................. 74/552
[51] Int. Cl. ...................................................... B62d 1/08
[50] Field of Search ............................................. 74/552

[56] References Cited
UNITED STATES PATENTS

| 1,929,409 | 10/1933 | Carr | 74/552X |
| 2,179,013 | 11/1939 | Kaye | 74/552 |
| 2,326,131 | 8/1943 | Eschebacher | 74/552 |
| 3,440,897 | 4/1969 | Dutt et al. | 74/552 |

Primary Examiner—William F. O'Dea
Assistant Examiner—F. D. Shoemaker
Attorney—Harness, Dickey & Pierce ABSTRACT: A steering wheel comprising a circular or ring-shaped rim member and a plurality of spoke members connected at their outer ends to the rim member and extending radially inwardly therefrom; the spoke members being pivotably supported at intermediate portions thereof by means of a substantially hollow hub member affixed to the upper end of the steering column, whereby a downwardly directed force exerted against the rim at any segmental portion thereof is transmitted to the spoke members and effects simultaneous pivotal movement thereof such that the entire rim member is displaced axially away from the vehicle operator.

INVENTOR.
Robert T. Curcuru
BY
Harness, Dickey & Pierce
ATTORNEYS

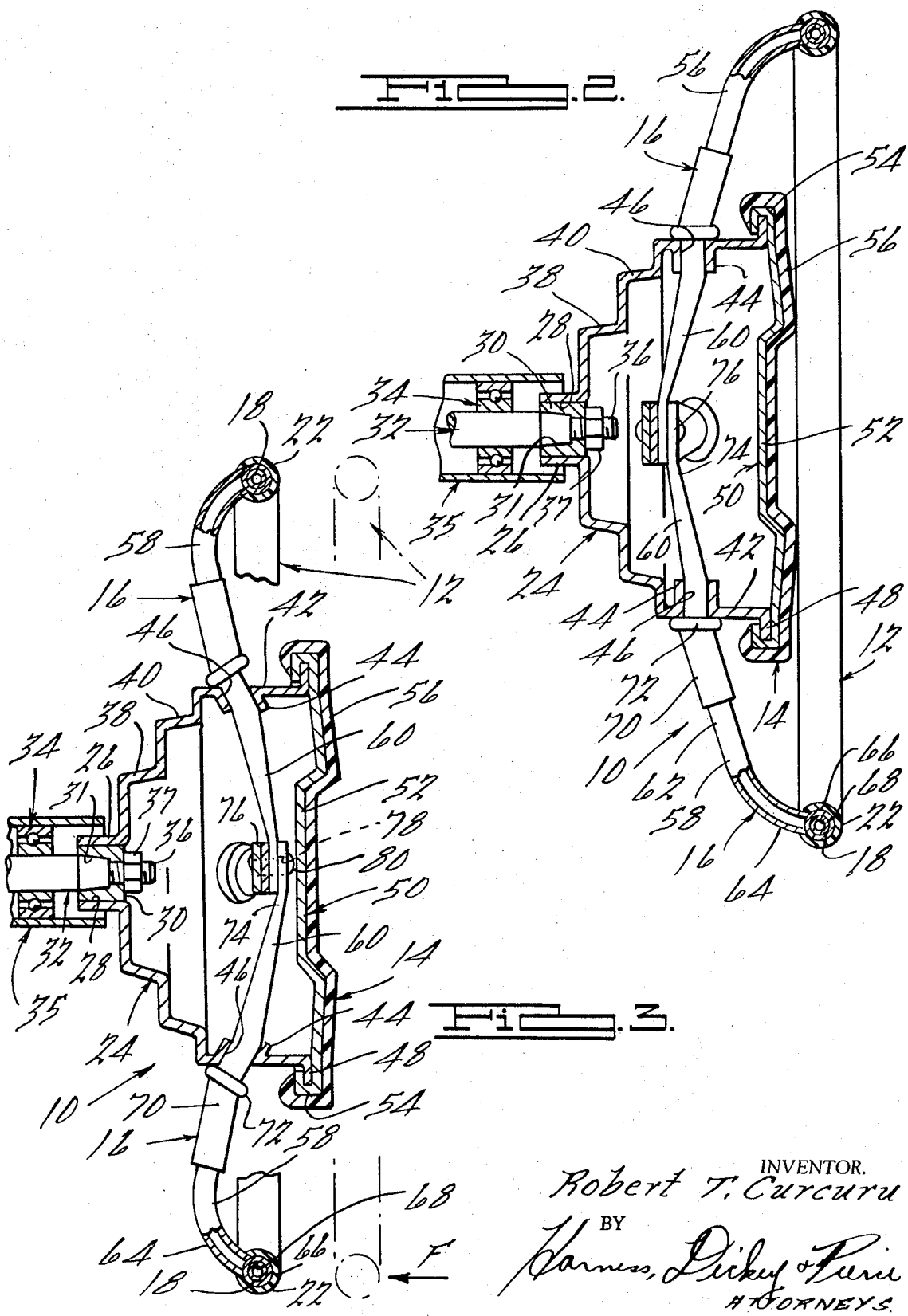

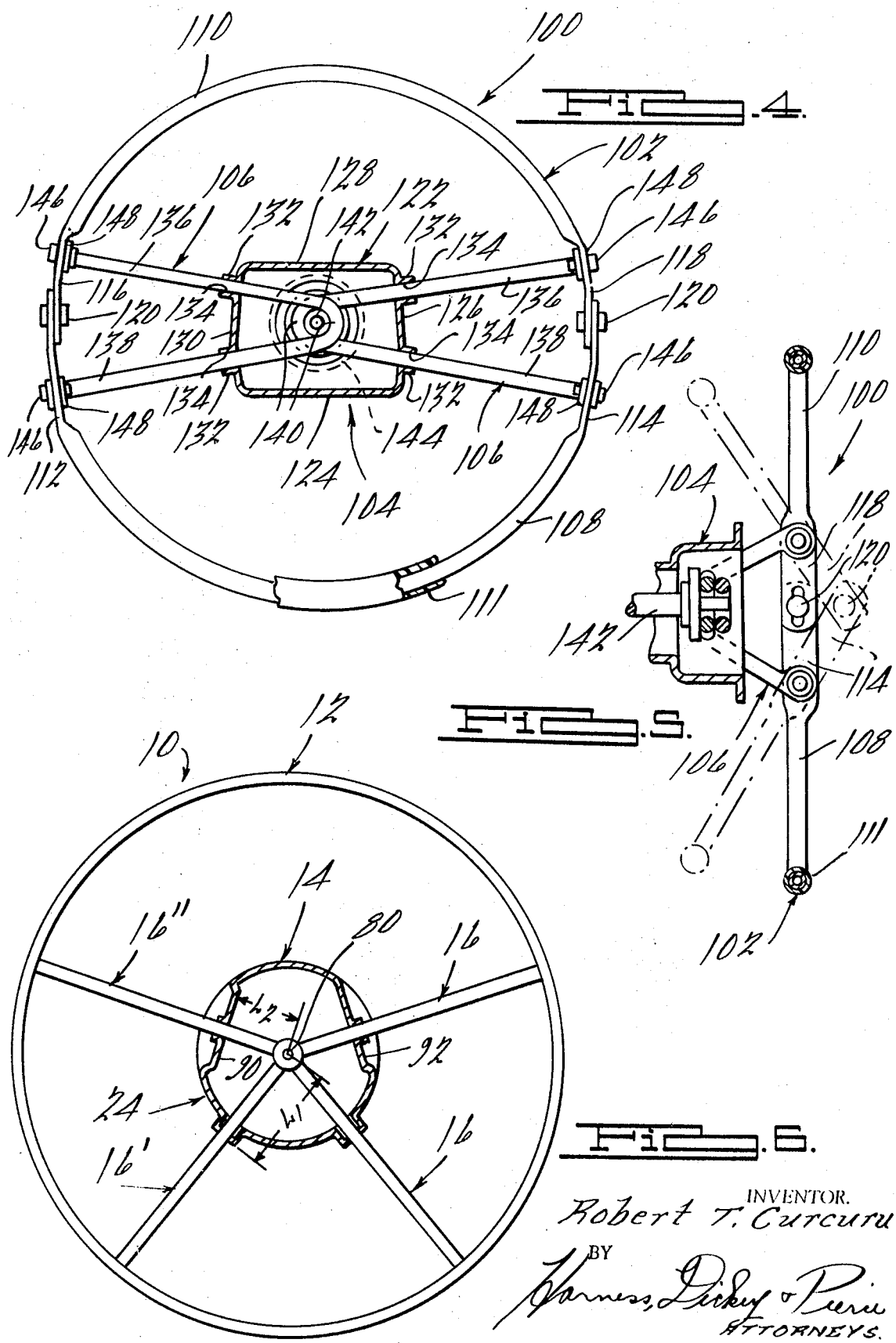

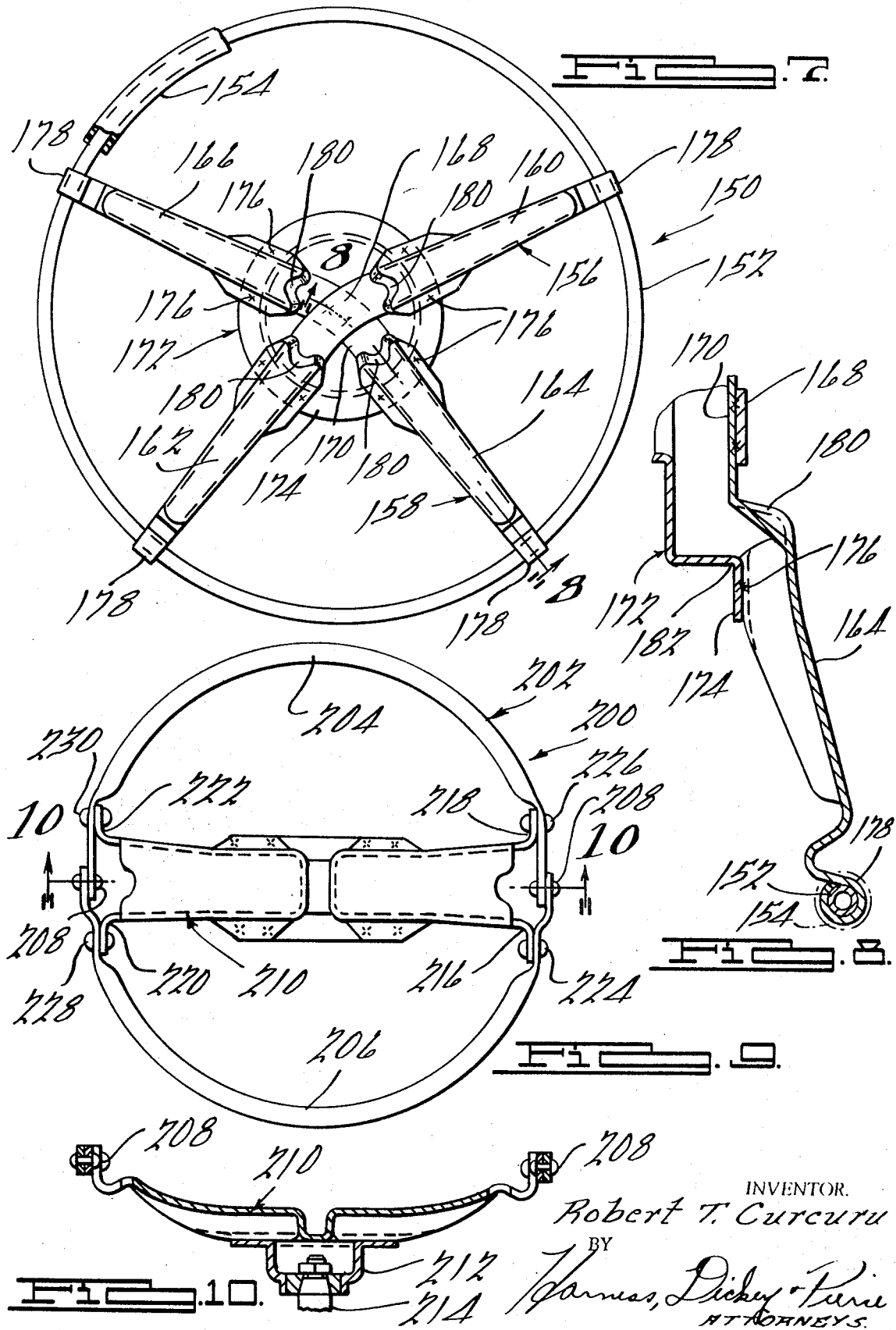

3,583,255

SAFETY STEERING WHEEL

BACKGROUND OF THE INVENTION

It has long been recognized that one of the greatest dangers in automobile collisions is the likelihood of serious chest, facial and similar bodily injuries to the driver resulting when the driver's momentum hurls him suddenly against a rigid and nonyielding conventional steering column and wheel assembly. Such injuries are primarily due to the secondary collision which occurs milliseconds after the vehicle has been brought substantially or completely to a halt, wherein the driver's body is still in motion and comes crashing forward into engagement with the steering wheel and support column therefor. Of course, such injuries are also due in part to the tendency of the steering shaft and steering wheel mounted thereon to move rearwardly toward the driver during the primary collision.

To date, it has been proposed to reduce injuries incurred from such collisions through the use of a "breakaway" construction that allows the steering wheel and column to breakaway from their support at the instrument panel when impacted by the driver's body. However, such a design still maintains the impact loading at fairly high values due to the inertia forces inherent in the mass of the steering wheel column. More recently, improvements have been made in the steering wheel itself by padding the steering wheel rim and spokes so as to distribute the impact forces somewhat when the driver's body comes in contact therewith; however, due to limitations of handgrip size, the wheel rim must remain essentially unpadded, which presents a localized hard surface that is capable of causing facial as well as other bodily injuries, even in low impact accidents. Additionally, the angle or relative orientation of the steering wheel, as required for convenient steering, seating, and ease of entry into a vehicle, is such that the driver's body, in a secondary collision, first impacts or engages the bottom or lower segmental portion of the steering wheel rim. This causes the rim to rotate, essentially about the steering column's centerline, resulting in a rearward acceleration of the upper segmental portion of the wheel rim at the same time as the driver's head is accelerating forward. This, in turn, results in a severe impact of the driver's head with the steering wheel rim, even in low speed accidents, since the small frontal area of the rim imparts a localized and severely damaging impact to the facial bones.

Generally speaking, the present invention provides a new and improved safety steering wheel that is designed such that when any segment of the steering wheel rim is deflected forwardly and downwardly, as a result of the driver's body being thrust forward into engagement therewith, such forward movement of any one segment of the steering wheel rim results in all other segments of the rim to be deflected forwardly and downwardly. In the broadest sense, the principles of the present invention are accomplished through a unique interaction between the steering wheel spokes. These spokes are pivotably mounted in a central wheel hub, are interconnected at their inner ends, and are relatively free to rotate at their outer ends at the wheel rim. Thus, a downward force, exerted at any segment of the steering wheel rim, causes the spokes in that area to pivot within the central hub. By virtue of the fact that the inner ends of all of the spokes are interconnected, pivotal movement of the spokes in the impact area results in simultaneous pivotal movement of all of the remaining spokes, thus causing all segments of the wheel rim to travel downwardly along the steering column axis and obviating any rearward movement of the steering wheel rim toward the vehicle operator.

SUMMARY OF THE INVENTION

This invention relates generally to safety devices for automotive vehicles and, more particularly, to a new and improved safety steering wheel.

It is accordingly a general object of the present invention to provide a new and improved safety steering wheel for automotive vehicles.

It is a more particular object of the present invention to provide a new and improved safety steering wheel comprising a steering wheel rim adapted to be displaced axially downwardly upon impact of a vehicle driver with any segmental section thereof.

It is another object of the present invention to provide a safety steering wheel of the above character which includes two or more radially extending spoke members that are interconnected at their innermost ends, are pivotably supported at intermediate portions thereof, and are rotatably connected at their outer ends to the wheel rim.

It is a further object of the present invention to provide a new and improved safety steering wheel of the above-described type wherein the steering wheel rim may be provided in two segmental sections pivotally connected to one another, whereby such sections may be pivoted downwardly or away from the vehicle driver even though the wheel may be provided with only two spokes that are disposed in a relatively horizontal orientation.

It is another object of the present invention to provide a new and improved safety steering wheel wherein the spokes are telescopically constructed.

It is still a further object of the present invention to provide a new and improved safety steering wheel of the above-described type which is of a relatively simple design, is economical to manufacture and easy to assemble.

Other objects and advantages of the present invention will become apparent from the following description taken in conjunction with the accompanying drawings.

BRIEF DESCRIPTION OF THE DRAWINGS

FIG. 2 is a side elevational view, partially broken away, of the safety steering wheel illustrated in FIG. 1;

FIG. 3 is a view similar to FIG. 2 and illustrates the safety steering wheel of the present invention when in a collapsed condition;

FIG. 4 is a side elevational view of a safety steering wheel embodying an alternate construction of the present invention;

FIG. 5 is a side elevational view, partially broken away and partially in phantom, illustrating the safety steering wheel shown in FIG. 4 in a collapsed condition;

FIG. 6 is a side elevational view, partially broken away, of yet another embodiment of the safety steering wheel of the present invention;

FIG. 7 is a side elevational view, partially broken away, of yet another embodiment of the safety steering wheel of the present invention;

FIG. 8 is a fragmentary cross-sectional view taken along the line 8–8 of FIG. 7;

FIG. 9 is a side elevational view of still another embodiment of the safety steering wheel of the present invention; and FIG. 10 is a transverse cross-sectional view taken substantially along the line 10–10 of FIG. 9.

DETAILED DESCRIPTION OF A PREFERRED EMBODIMENT

Figure 1:
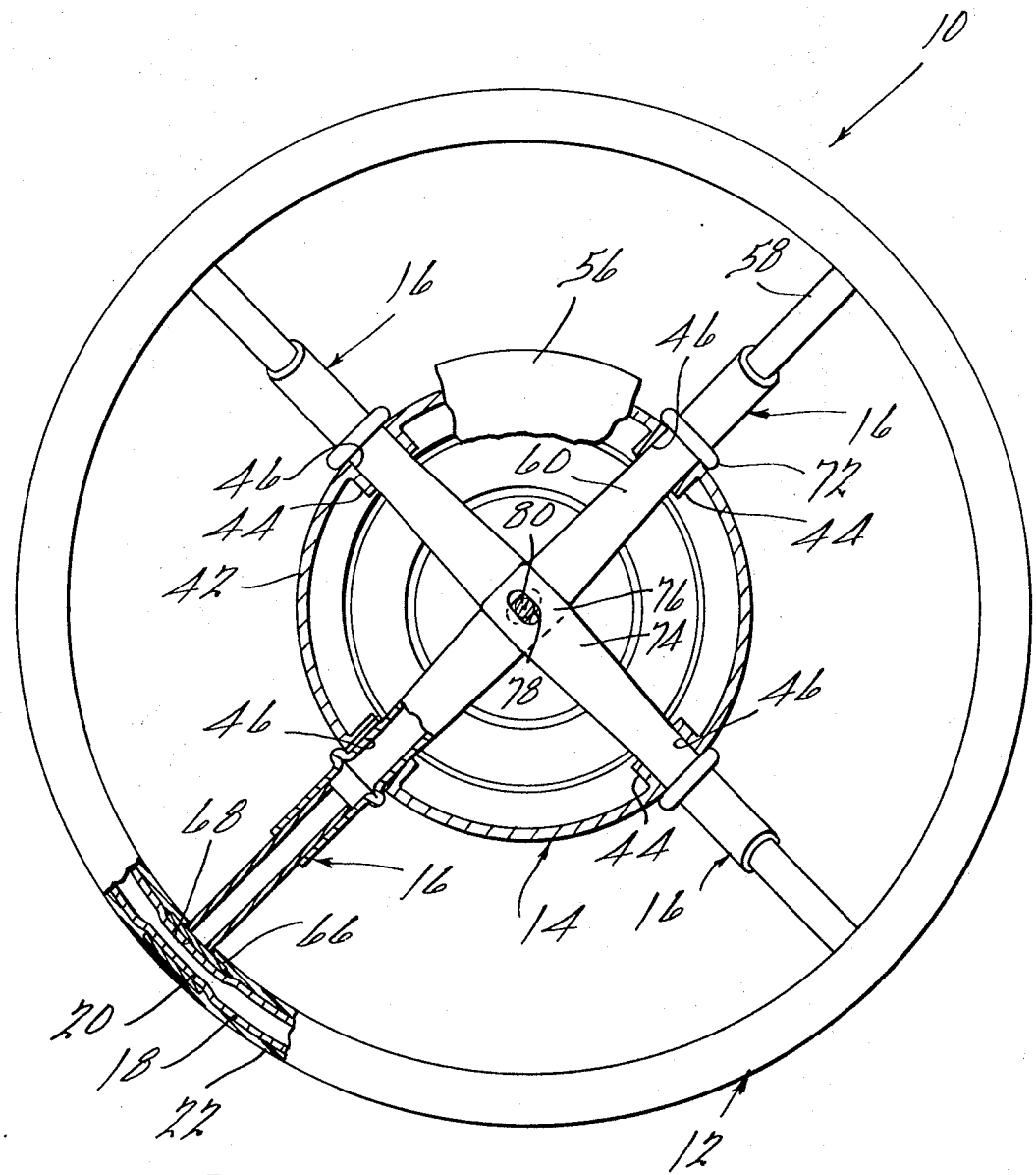
FIG. 1 is a side elevational view, partially broken away, of a safety steering wheel embodying the principles of the present invention.

Referring now in detail to the drawings, a safety steering wheel 10, in accordance with a preferred embodiment of the present invention, is shown as generally comprising a rim member 12, which is of a generally circular configuration, a hub assembly 14 disposed centrally of said rim member 12, and a plurality of spokes, generally designated 16, which extend radially between the rim member 12 and the hub assembly 14 and are adapted to function in a manner hereinafter described and controlling movement of the member 12 in response to a bodily impact therewith, as would occur when the vehicle in which the steering wheel 10 is mounted is involved in a front end collision or the like.

Referring now in detail to the construction of the rim member 12, as best seen in FIGS. 1 through 3, the member 12 comprises a rigid, circular reinforcing member 18 which is of a generally tubular configuration in transverse section and is preferably fabricated, for example, out of metal or a similar relatively strong, nondeformable material such as certain types of synthetic plastics or the like well known in the art. The reinforcing member 18 is formed with a plurality (four) of reduced diameter or thickness portions, generally designated 20, which function to operatively support the radially outer ends of the spokes 16 in a manner later to be described. The entire outer surface of the rim member 12 is preferably provided with a suitable covering material 22 which may consist of molded plastic, vinyl or a relatively resilient material such as urethane foam or the like, as is well known in the art, the covering material 22 servicing to cushion the vehicle operator against impact with the steering wheel 10 during a collision, as will be apparent.

As best seen in FIGS. 2 and 3, the hub assembly 14 comprises a generally cup-shaped hub member 24, one end of which defines an axially extending annular flange section 26 forming a bore or opening 28 located coaxially of the steering wheel 10. The bore 28 is adapted to receive a suitable fitting member 30 which defines a tapered internal bore 31 for receipt of the generally tapered upper end of a conventional steering shaft, representatively designated by the numeral 32. The steering shaft 32 is mounted in a conventional manner via suitable antifriction bearing means 34 within a steering column 35, as illustrated. The upper end of the steering shaft 32 is formed with a reduced diameter, externally threaded portion 36 which is adapted to receive thereon a suitable locking nut or the like 37 that functions to positively secure the steering shaft 32 within the fitting 30 and hence secure the hub member 24 on the upper end of the steering shaft 32, whereby the hub member 24 is rotatable along with the steering shaft 32 relative to the steering column 35.

The hub member 24 is formed with a pair of adjacently oriented, successively enlarged sections 38 and 40, and with an annular, enlarged diameter sidewall section 42. The sidewall section 42 is formed with a plurality (four) of radially inwardly extending integral sleeve sections, generally designated 44, which define central radially inwardly extending circumferentially spaced bores or passages 46 that are circumferentially aligned with the reduced diameter sections 20 of the rim member 12 and through which the spokes 16 extend, as will be described. The axially outer end of the sidewall section 42 of the hub member 24 is formed with a radially outwardly extending flange section 48 that is adapted to operatively support a generally radially disposed cover member 50 thereon. The cover member 50 comprises a generally dished, central or intermediate section 52, the outer periphery of which is formed with a reversed bend, annular clamping or crimping section 54 adapted to be clampingly or crimpingly engaged with the flange section 48 of the hub member 24, whereby to positively secure the cover member 50 to the hub member 24. The hub assembly 14 may be and preferably is provided with a layer or coating of a suitable resilient material 56, for example, urethane foam, sponge rubber or the like, which extends entirely across the side of the cover member 50 confronting the vehicle operator and around the side edges thereof into peripheral engagement with the rearward side of the section 54. As will be apparent, the material 56 functions to act as a cushioning means to prevent injury to the vehicle driver in the event he is thrown forward and impinged upon the confronting side of the hub assembly 14 during a collision. The hub member 24 may be fabricated of any suitable relatively rigid material, either metallic or nonmetallic, provided, however, that the sleeve sections 44 are permitted to pivot or deform slightly from the positions shown in FIG. 2 to the positions shown in FIG. 3, for purposes hereinafter to be described.

The safety steering wheel 10 of the present invention preferably utilizes four of the spokes 16, all of which are preferably identical in construction and operation, although it will be apparent to the skilled artisan that more or less of the spokes 16 may be used where desired. Each of the spokes 16 comprises radially outer and inner sections 58 and 60, respectively, which are adapted to be telescopically engaged with one another and thereby permit relative radial movement therebetween. More particularly, the radially outer sections 58 of each of the spokes 16 is of a relatively small diameter and comprises a substantially straight or linear section 62 which terminates toward its radially outer end in either a relatively curved or straight section 64. Mounted on the outer end of the section 64 is an annular mounting collar 66 defining a central bore 68 within which the reduced diameter section 20 of the rim member 12 is adapted to be received, with the result that the outer end of each of the spokes 16 is mounted for relatively pivotal movement with respect to the wheel rim member 12. Insofar as assembly of the spokes 16 on the rim member 12, the collar 66 may be of the slit-type, or alternatively, the rim member 12 may consist of a plurality (four) of segmental sections each terminating at each end thereof in a reduced thickness portion 20 adapted for insertion axially into the bore 68, as will be apparent.

The radially inner section 60 of each of the spokes 16 is formed with an annular or sleevelike section 70 which defines a central bore (not shown) that is slightly larger than the outer diameter of the spoke sections 58 and is thereby adapted to receive the spoke sections 58 therewithin for relative sliding movement. The sleeve sections 70 each define a radially outwardly extending flange section 72 which is adapted to be abuttingly engaged with the outer periphery of the sidewall section 42 of the hub member 24, as best seen in FIGS. 2 and 3. The spoke sections 60 extend radially inwardly through the bores 46 defined by the sleeve sections 44 of the hub member 24, with the radially inner ends of the spoke sections 60 being slightly reduced in cross section or thickness, as seen at 74. The radially innermost ends of the spoke sections 60 are formed with flattened portions 76 which are aligned with the rotational axis of the steering wheel 10 and are formed with central axially extending oversize bores 78 through which suitable fastening means, such as a screw, bolt, rivet or the like 80 extends to secure the inner ends of all the spokes 16 together, while allowing for spoke swing geometry which causes sliding action. It will be apparent, of course, that the inner ends of the spokes 16 may be secured in various alternate manners, such as through the use of a ball and socket assembly or other arrangement which will permit concomitant movement thereof relative to the hub member 24 in the manner described in connection with the overall operation of the safety steering wheel 10. Also, it will be apparent that various alternate means may be employed for permitting relative radial and sliding movement between the spoke sections 58, 60.

In operation, the safety steering wheel 10 is adapted to operate in a conventional manner in effecting selective rotational movement of the steering shaft 32 for steering the associated automotive vehicle. At such time as the vehicle is involved in a front end collision or the like, the vehicle operator will be thrust forward, thereby exerting a force F (see FIG. 3) against the lower segmental portion of the rim member 12. When this occurs, the lower segmental portion of the rim member 12 will be biased forwardly, for example, from the phantom line position in FIG. 3 to the solid line position in this Figure, which results in the adjacent of the spokes 16 being pivoted, for example, in a counterclockwise direction as seen in FIGS. 2 and 3, about a point substantially radially aligned with the annular sidewall section 42 of the hub member 24, with the result that the inner end of the associated spoke, i.e., the flattened portion 74 thereof, will be biased axially outwardly or away from the upper end of the steering shaft 32. By virtue of the fact that all of the spokes 16 are connected together at their inner ends, via the fastening means 80, as the inner end of the aforesaid spoke 16 is pivoted counterclockwise, the inner ends of all of the other spokes 16 will be biased axially outwardly simultaneously therewith, with the result that all of the spokes 16 are pivoted about the annular sidewall section 42 of the hub member 24 from the positions shown in FIG. 2 to the positions shown in FIG. 3, which in turn results in axial displacement of the entire rim member 12 away from the vehicle operator. By virtue of the connection of the radially outer ends of the spokes 16 to the wheel rim member 12, the aforesaid pivotal movement of the spokes 16 results in axially downward movement of the entire rim member 12, regardless of the particular segmental portion of the wheel rim member 12 against which the force F is exerted. Thus, the entire rim member 12 will move downwardly away from the vehicle driver in an essentially parallel orientation instead of the upper segmental portion of the rim member 12 being biased rearwardly in response to a forwardly directed force F against the lower side of the rim member 12, as would occur in conventional steering wheels. The telescopic interconnection between the radially outer and inner sections 58 and 60 of the spokes 16 is designed to provide controlled friction for energy absorption and also permit the vehicle operator's hands to drive the rim member 12 downwardly and cause a lengthening or extension thereof, thereby decreasing the impact loading exerted by the wheel rim member 12 against the operator's hands and reducing the possible injury to the operator.

FIG. 6 illustrates a slightly modified embodiment of the present invention wherein the hub member 24 is formed with two relatively indented or radially displaced side sections 90 and 92, and wherein the spoke 16, instead of being equally circumferentially spaced, are arranged substantially adjacent the lower segmental portion of the rim member 12. The purpose of thus radially orienting the spokes 16 in the bottom half of the steering wheel is to assure that an adequate number of spokes are forced downwardly by the bodily impact of the vehicle driver against the lower end of the wheel during a collision, thereby improving the reliability of the uppermost segmental portion of the rim member 12 moving in a downward direction or away from the vehicle operator.

The purpose of indenting or offsetting the sections 90, 92 of the hub member 24 is to vary the effective length between the inner ends of the spoke 16 and the pivotal connection thereof with an annular wall section 42 of the hub member 24, and the distance between the wall section 42 and the wheel rim 12. It will be seen in FIG. 6 that the distance $L_1$ between the fastening means 80 and the pivotal connection between the spoke 16' and the hub member 24 is greater than the distance $L_2$ between the fastening means 80 and an indented or radially inwardly offset section 90 of the hub member 24 pivotably supporting another of the spokes 16''. By thus having the distance $L_1$ greater than $L_2$, as the lower segmental 1 of the wheel rim 12 is biased downwardly, as would occur in a vehicle collision, the portion of the lowermost spoke 16 designated by the dimension $L_1$ will move upwardly, thereby imparting its linear velocity to the inner end of section $L_2$. $L_2$, being a shorter lever than $L_1$ will rotate about the hub pivot point at a greater angular velocity than $L_1$. This greater angular velocity of $L_2$ will result in a greater linear velocity of the outer end of 16'' and cause the upper segment of the rim to move downwardly away from the vehicle operator at a somewhat greater speed than the lower portion, thus further assuring against facial or other bodily injury of the vehicle operator striking the wheel rim 12.

FIGS. 4 and 5 illustrate still another embodiment of the present invention wherein a safety steering wheel 100 is shown as comprising a rim member 102, a central hub assembly 104 and a plurality of spokes 106 extending radially between the rim member 102 and assembly 104. More particularly, the rim member 102 is shown as comprising two substantially identical segmental sections 108 and 110, each of which extends approximately one-half way around or 180° of the circumference of the member 102. The sections 108, 110 are preferably fabricated of a suitable tubular rigid material and are provided with an external covering or padding 111 which may be of the same construction as the aforedescribed covering 22 on the steering wheel 10 hereinabove described.

As best seen in FIG. 4, the opposite ends of each of the rim sections 108, 110 are flattened, as seen at 112, 114 and 116, 118, with the flattened end portions 114, 118 and 112, 116 being pivotally connected to one another by means of a pair of suitable pivot pins, bolts, screws, rivets or the like 120, whereby the two rim sections 108, 110 are relatively pivotable between the solid line positions shown in FIG. 5 and the phantom line positions shown in this Figure, for purposes later to be described.

The hub assembly 104 may be of substantially the same construction as the aforedescribed assembly 14, with the exception that the assembly 104 comprises a hub member 122 which is generally rectangular in transverse section and defines a plurality of spaced apart sides 124, 126, 128 and 130, as seen in FIG. 4. The opposed sides 126, 130 are each formed with a pair of radially outwardly extending sleeve portions, generally designated 132, which define radially outwardly extending bores or openings 134. As will hereinafter be described in detail, the bores 134 are adapted to have the spokes 106 extend therethrough, whereby the spokes 106 can be connected at their outer ends to the rim member 102 and at their inner ends to each other in much the same manner as described hereinbefore and shown in FIGS. 2 and 3.

As best illustrated in FIG. 4, each of these spokes 106 is of a generally V-shaped configuration and consists of a pair of radially and axially outwardly extending diverging leg sections 136 and 138 which are interconnected by means of a generally semicircular intermediate section 140. It will be seen that the spokes 106 are arranged such that the intermediate sections 140 thereof are interconnected by a suitable pin, screw or the like 142 and are arranged such that the leg sections 136, 138 thereof project radially outwardly in substantially diametrically opposite directions and in substantial radial alignment with the sleeve portions 132 and the pivotal connection between the rim sections 108, 110. The leg sections 136, 138 extend radially outwardly through the bores 134 defined by the sleeve portions 132 of the hub member 122. The radially outermost ends of the spoke leg sections 136, 138 are formed with the reduced diameter mounting sections 146 which are adapted to extend through suitable openings formed in the flattened end portions 112, 114, 116 and 118 of the rim sections 108, 110, with suitable bushing, bearing or other pivotal means 148 being provided on the radially outer ends of the spoke leg sections 136, 138 to provide for relative pivotal movement of the rim sections 108, 110 with respect to the outer ends of leg sections 136, 138.

In operation, the steering wheel assembly 100 is adapted to function in a normal manner in effecting rotation of the steering shaft 142 in response to rotation of the rim member 102; however, at such time as the associated vehicle is involved in a front end collision or the like, and when the two-spoke system is in a substantially horizontal position, the vehicle operator will be thrust forward, thereby engaging the lower or axially outermost segmental portion of the assembly 100. When this occurs, the lower segmental section 108 of the steering wheel rim 102 will be biased from the solid line position in FIG. 5 to the phantom line position in this Figure about a pivotal axis defined by the end sections 146 of the spoke leg sections 138. As the segmental rim section 108 is thus moved, the terminal or uppermost end portions 114 and 112 thereof will be pivoted axially outwardly or toward the vehicle operator about an axis extending through the pivot means 120, with the result that the upper segmental section 110 of the rim member 102 will be pivoted from the solid line position in FIG. 5 to the phantom line position in this Figure, i.e., in a counterclockwise direction about a pivotal axis defined by the outer end sections 146 of the leg sections 136. Accordingly, axially forward movement of the vehicle operator against the rim member 102 will result in the lower segmental section 108 of the member 102 being biased or deformed forwardly, and at the same time, via the pivotal connection between the upper and lower rim sections 108, 110, the upper segmental section 110 will be simultaneously biased forwardly or away from the vehicle operator, thereby reducing to the extreme, the possibility of the vehicle operator's head or other portion of his body being impinged against the upper rim section 110. If the steering wheel is turned 90 from the above horizontally disposed spoke position, the forward movement of the lower portion of the rim will cause the spokes to interact between lower and upper segments much as in earlier descriptions and cause the upper rim segment to move downwardly, much the same as illustrated in FIG. 3.

FIGS. 7 through 10 illustrate two additional embodiments of the present invention which are adapted to function in much the same manner as the steering wheels 10 and 100 hereinabove described, but which utilize stamped metal spokes that are so designed that they may serve the same purposes as the telescoping function of the spokes 16 and pivotal supporting function of the spoke 106 of the steering wheels 10 and 100, respectively. More particularly, FIGS. 7 and 8 illustrate a steering wheel 150 having a rim member 152 which may be provided with a suitable covering material 154. The steering wheel 150 comprises a pair of spoke members 156 and 158 which comprise radially extending spoke sections 160, 162 and 164, 166 that are angularly displaced from one another and extend radially outwardly from centrally located intersecting sections 168 and 170 that are fixedly secured to one another, as by spot welding or the like. The spoke members 156, 158 are adapted to be fixedly secured to a central hub member 172 having a radially outwardly extending flange section 174 secured as by spot welding or the like to the rearward sides of the spoke members 156, 158, as seen at 176. The radially outer ends of the spoke sections 160—166 are provided with collar sections 178 through which the rim member 152 extends so as to pivotably connect the rim member 152 to the spoke members 156, 158. The spoke members 156, 158 are designed such that the sections 180 thereof may be bent or deformed relatively easily in a direction radial to the hub center line. This, together with the fact that the intersection of the flange section 174 of the hub member 172 is adapted to deflect about a point 182, which in effect, acts as a hinge means, permits the steering wheel 150 to function in the same manner as the steering wheel 10 when the lower segmental section of the rim member 152 is engaged by the vehicle operator during a collision.

FIGS. 9 and 10 illustrate a steering wheel 200 having a steering rim member 202 constituting a pair of segmental rim sections 204 and 206 which are similar to the segmental rim sections 108, 110 and are pivotably connected by means of suitable pivot pins or the like 208 so as to provide for relative pivotal movement therebetween. The steering wheel 200 comprises a central diametrically extending stamped metal spoke member 210 adapted to be fixedly secured at a central portion thereof to a suitable mounting hub 212 which may be affixed by any suitable means to an associated steering shaft 214. The radially outer ends of the hub member 212 are provided with opposed pairs of circumferentially projecting mounting flange sections 216, 218 and 220, 222. The flange sections 216, 218 are adapted to be pivotably connected by suitable pivot pin means 224, 226 to the rim sections 206, 204, respectively, while the flange sections 220, 222 are adapted to be pivotably connected by means of suitable pivot pin means 228, 230 to the rim sections 206, 204, respectively, at the opposite sides thereof from the pivotal connections of the sections 206, 204 with the flange sections 216, 218. With this arrangement, it will be seen that the segmental rim sections 206, 204 are adapted to function in substantially the same manner as the rim sections 108 and 110 in biasing the uppermost rim section 204 away from the vehicle operator's head, face or the like upon engagement of the operator with the lower rim section 206, as hereinabove described in detail.

It will be seen from the foregoing description that the present invention provides a new and improved safety steering wheel which is designed to minimize the possibility of a vehicle operator being thrust against the upper segmental portion of a vehicle steering wheel, thereby obviating the potential injuries to which vehicle operator's have heretofore been subjected to due to the rearward movement of the steering wheel rim concomitant with forward movement of the vehicle operator during a front end collision or the like. By virtue of the fact that the safety steering wheel of the present invention is of a relatively simple design, it will be economical to commercially manufacture, and easy to install. Another feature of the present invention will be seen from the fact that the safety steering wheel may be operatively mounted on virtually all types of vehicles, thereby providing for universality of application.

While it will be apparent that the preferred embodiment illustrated herein is well calculated to fulfill the objects abovestated, it will be appreciated that the present invention is susceptible to modification, variation and change without departing from the scope of the invention.

I claim:

1. In a safety steering wheel assembly adapted for mounting on the steering column of an automotive vehicle or the like,
    a generally circular rim member normally disposed along a plane extending transversely to the steering column,
    a hub member disposed centrally of said rim member for operatively securing said assembly to said steering column,
    at least two spoke members extending radially between said hub member and said rim member, and
    means associated with said spoke members interjacent the radially inner and outer ends thereof and providing for pivotal movement of said radially outer ends of said members axially away from the vehicle operator in response to an axially directed impact force acting to displace any segmental portion of said rim member, whereby said impact force results in substantially parallel displacement of the entire rim member axially of said steering column.

2. A safety steering wheel assembly as set forth in claim 1 wherein the radially outer ends of said spoke members are movably connected to said rim member.

3. A safety steering wheel assembly as set forth in claim 1 wherein the radially outer ends of said spoke members are pivotably connected to said rim member.

4. In a safety steering wheel assembly adapted for mounting on the steering column of an automotive vehicle or the like,
    a generally circular rim member normally disposed along a plane extending transversely to the steering column,
    a hub member disposed centrally of said rim member for operatively securing said assembly to said steering column,
    at least two radially extendable and collapsible spoke members extending radially between said hub member and said rim member, and
    means supporting said spoke members whereby an impact force acting to axially displace any segmental portion of said rim member results in substantially parallel displacement of the entire rim member axially of said steering column.

5. A safety steering wheel assembly as set forth in claim 4 wherein each of said spoke members comprises first and second radial sections which are telescopically engaged with one another so as to be extendable and collapsible in a radial direction.

6. In a safety steering wheel assembly adapted for mounting on the steering column of an automotive vehicle or the like,
    a generally circular rim member normally disposed along a plane extending transversely to the steering column,
    a hub member disposed centrally of said rim member for operatively securing said assembly to said steering column,
    at least two spoke members extending radially between said hub member and said rim member and connected to one another adjacent the radially innermost ends thereof, and
    means supporting said spoke members whereby an impact force acting to axially displace any segmental portion of said rim member results in substantially parallel displacement of the entire rim member axially of said steering column.

7. In a safety steering wheel assembly adapted for mounting on the steering column of an automotive vehicle or the like, a generally circular rim member normally disposed along a plane extending transversely to the steering column, a hub member disposed centrally of said rim member for operatively securing said assembly to said steering column, at least two spoke members extending radially between said hub member and said rim member, portions of said spoke members intermediate the radially inner and outer ends thereof being pivotally connected to said hub member, and means supporting said spoke members whereby an impact force acting to axially displace any segmental portion of said rim member results in substantially parallel displacement of the entire rim member axially of said steering column.

8. A safety steering wheel assembly as set forth in claim 7 wherein said hub member comprises a generally annular wall disposed substantially coaxially of said rim member, said wall being formed with a plurality of radially extending openings through which said spoke members extend and are thereby movably connected to said hub member.

9. A safety steering wheel assembly as set forth in claim 7 which includes at least three circumferentially spaced, radially outwardly extending spoke members, each of said spoke members extending radially of said hub member and being pivotably connected thereto at an intermediate portion thereof, with all of said spoke members being connected to one another at a position substantially coaxially of the axis of rotation of the wheel assembly, the radial distance between the point of connection of said spoke members and the pivotal connection of one of said spoke members with said hub member being greater than the radial distance between said point of connection and the pivotal connection of another of said spoke members with said hub member.

10. A safety steering wheel assembly as set forth in claim 9 wherein said hub member comprises an annular sidewall which is formed with at least one indented portion, said indented portion having one of said spoke members pivotally connected thereto, whereby the distance between said pivotal connection of said hub member and said one of said spoke members is smaller than the distance between the point of connection of said spoke members and the connection of another of said spoke members pivotally connected to said hub members at a position out of radial alignment with said indented portion.

11. In a safety steering wheel assembly adapted for mounting on the steering column of an automotive vehicle or the like, a generally circular rim member normally disposed along a plane extending transversely to the steering column, a hub member disposed centrally of said rim member for operatively securing said assembly to said steering column, a plurality of at least three radially extending spoke members primarily located adjacent the lower segmental portion of the rim member, whereby an impact force exerted by the vehicle operator against the lower segmental portion of the rim member will act to positively displace the entire rim member axially of said steering column.

12. In a safety steering wheel assembly adapted for mounting on the steering column of an automotive vehicle or the like, a generally circular rim member normally disposed along a plane extending transversely of the steering column, said member comprises at least two relatively movable and pivotably connected segmental sections, a hub member disposed centrally of said rim member for operatively securing said assembly to said steering column, at least two spoke members extending radially between said hub member and said rim member, and means interconnecting said spoke members with said rim member and said hub member, whereby an impact force acting to axially displace one of said segmental rim sections results in substantially simultaneous axial displacement of the other of said rim sections.

13. In a safety steering wheel assembly adapted for mounting on the steering column of an automotive vehicle or the like, a generally circular rim member normally disposed along a plane extending transversely of the steering column, said member comprises at least two pivotably connected segmental sections each extending approximately 180° around the circumference of the assembly, a hub member disposed centrally of said rim member for operatively securing said assembly to said steering column, at least tow spoke members extending radially between said hub member and said rim member and supporting said segmental sections of said rim member for relative pivotal movement, and means interconnecting said spoke members with said rim member and said hub member, whereby an impact force acting to axially displace one of said segmental rim sections results in substantially simultaneous axial displacement of the other of said rim sections.

14. A safety steering wheel assembly as set forth in claim 13 which includes a radially outwardly extending spoke section pivotably engageable with each end of each of said segmental rim sections.

15. A safety steering wheel assembly as set forth in claim 13 wherein said spoke members each comprise first and second radially outwardly extending leg sections, one of said leg sections of each of said spoke members being pivotably connected to one end of one of said segmental rim sections.

16. A safety steering wheel assembly as set forth in claim 15 wherein said spoke members are of a generally V-shaped configuration having first and second leg sections extending radially outwardly and pivotably engageable with the ends of said segmental rim sections.

17. A safety steering wheel assembly as set forth in claim 12 wherein said hub member is disposed centrally of said segmental rim sections, wherein said hub member comprises first and second circumferentially spaced portions defining radially outwardly extending openings, and wherein said spoke members extend through said openings and are pivotably engageable at their outer ends with said segmental rim sections.

18. A safety steering wheel assembly as set forth in claim 12 wherein said hub member is fabricated of stamped metal.

19. In a safety steering wheel assembly adapted for mounting on the steering column of an automotive vehicle or the like, a generally circular rim member normally disposed along a plane extending transversely to the steering column, a hub member disposed centrally of said rim member for operatively securing said assembly to said steering column, at least two stamped metal spoke members extending radially between said hub member and said rim member, and means supporting said spoke members whereby an impact force acting to axially displace any segmental portion of said rim member results in substantially parallel displacement of the entire rim member axially of said steering column.

20. The invention as set forth in claim 12 wherein each of said spokes comprises first and second portions, one portion of each of said spokes being connected to each of said segmental sections of said rim member.

21. The invention as set forth in claim 12 wherein said spokes are of a relatively deformable character.

22. The invention as set forth in claim 1 wherein said spoke members are pivotably connected to said hub member intermediate the radially inner and outer ends of said hub members, and wherein said spoke members are connected to one another at the radially inner ends thereof, with the radial dimensions between the point of connection of said spokes and the point of pivotal connection thereof to said hub member providing a mechanical advantage, whereby an impact force exerted on one portion of said rim member will result in a preselected axial movement of another portion of said rim member.